United States Patent [19]
Pajon et al.

[11] Patent Number: 6,050,635
[45] Date of Patent: Apr. 18, 2000

[54] SEAT PAN OF AN AUTOMOBILE VEHICLE SEAT INCLUDING AN ANTI-SUB-MARINING DEVICE

[75] Inventors: Marc Pajon, Prunay En Yvelines; Laurent Guerin, La Rochette, both of France

[73] Assignee: Bertrand Faure Equipements S.A., Boulogne Cedex, France

[21] Appl. No.: 09/213,926

[22] Filed: Dec. 17, 1998

[30] Foreign Application Priority Data

Dec. 24, 1997 [FR] France .................................. 97 16815

[51] Int. Cl.[7] ........................................................ B60N 2/42
[52] U.S. Cl. ........................................ 297/216.1; 297/483
[58] Field of Search ........................... 297/216.1, 216.14, 297/464, 452.18, 452.55, 483

[56] References Cited

U.S. PATENT DOCUMENTS 4,154,472  5/1979  Bryll .
4,225,178  9/1980  Takada .
5,125,472  6/1992  Hara .
5,556,160  9/1996  Mikami .
5,567,006  10/1996  McCarthy .
5,908,219  6/1999  Bohmler .

FOREIGN PATENT DOCUMENTS 2 747 080  10/1997  France .
2 747 081  10/1997  France .
38 41 688  6/1990  Germany .
42 12 254  4/1993  Germany .
58-053525  3/1983  Japan .
WO 92/06861  4/1992  WIPO .

Primary Examiner—Milton Nelson, Jr.
Attorney, Agent, or Firm—Pollock, Vande Sande & Amernick

[57] ABSTRACT

A seat pan is provided for an automobile vehicle seat and includes an anti-sub-marining cross-member that limits the movement of a user's pelvis toward the front of the seat. The cross-member extends crosswise to a seat pan framework and moves under the action of a cable, from a rest position to an extended position. In the extended position, the cross-member limits the movement of the user's pelvis toward the front of the seat. The ends of the cross-member are guided along a first trajectory and the seat pan includes energy dissipation means for controlling, from a predetermined threshold and from the extended position of the cross-member, forces transmitted by the seat to a user.

8 Claims, 6 Drawing Sheets

SEAT PAN OF AN AUTOMOBILE VEHICLE SEAT INCLUDING AN ANTI-SUB-MARINING DEVICE

FIELD OF THE INVENTION

The invention concerns an automobile vehicle seat pan including an anti-sub-marining device.

BACKGROUND OF THE INVENTION

Conventionally, seat belts have an oblique portion and a ventral portion which are applied respectively with a certain tension against the chest and the pelvis of the person using the seat. When a shock on the vehicle tends to throw the user towards the front of the vehicle, for example during an accident, the seat belt is blocked, in a manner known itself, to firmly hold the user against seat.

In this case, the user is then subjected to a high deceleration and, under his or her inertia, moves in relation to the belt. This movement can cause serious injuries to the body, in particular abdominal injuries, when the user's pelvis tends to pass under the ventral portion of the seat belt by the sliding of the user's buttocks on the seat pan. This phenomenon is generally called sub-marining.

To solve this problem, it is already known, especially in French patent document FR-A-2747080, to use a bar, designated hereafter as "anti-sub-marining cross-member" or "anti-sub-marining bar", which is placed crosswise in the seat pan and which extends during a shock to limit the movement of the user's pelvis towards the front of the seat.

The cross-member is connected by its ends to two triangular-shaped links installed so as to pivot on the seat pan framework. In a rest position, the cross-member is located more or less level with the user's buttocks and, during a shock, the cross-member tilts upwards and towards the front of the seat, under the action of a belt pyrotechnical pretensioner, to an extended position, to form an obstacle preventing the user's buttocks from moving forwards thus preventing the buttocks from passing under the ventral portion of the belt.

When the cross-member is in an extended position, the user's pelvis exerts a thrust on the cross-member which may cause excessive compression of the user's lumbar region. Use of energy dissipation means is then provided to limit the reaction force transmitted by the cross-member to the user by enabling, from a predetermined threshold, progressive retraction of the cross-member into the seat pan, retaining but enabling a certain movement of the pelvis.

The energy dissipation means are, for example, oblong grooves, made along one of the sides of the triangular links, in which the ends of the cross-member move. As the width of the said grooves is appreciably lower than the transverse dimension of the ends of the cross-member, the energy dissipation is obtained by the deformation of the edges of the groove by the ends of the cross-member from a determined threshold.

In a known system, during extension, the cross-member moves both upwards and towards the front of the seat. At rest, the cross-member is located more or less at the rear of the seat at a location where the weight of the user may hinder the start of extension or at least require a relatively high force to extend the cross-member.

BRIEF DESCRIPTION OF THE INVENTION

The purpose of this invention is to avoid these disadvantages and aims at proposing an anti-sub-marining cross-member capable of limiting injuries to the user of the seat by controlling the movement of the cross-member and the force transmitted to the user of the seat while ensuring better retention during a shock. In particular, it aims in providing an anti-sub-marining cross-member which requires only a low extension force.

With these targets in mind, the subject of the invention is a seat pan for an automobile vehicle seat including an anti-sub-marining cross-member to limit the movement of the pelvis of a user towards the front of the seat, the cross-member extending crosswise to the seat pan framework and moving under the action of drive means, from a rest position to an extended position where the cross-member limits the movement of the pelvis towards the front of the seat, the ends of the cross-member being guided by guide means along a first trajectory and the seat pan including energy dissipation means to control, from a predetermined threshold and from the extended position of the cross-member, the forces transmitted by the cross-member to the seat occupant. According to the invention, the seat pan is characterized in that the first trajectory is oriented upwards and towards the rear of the seat.

According to the invention, the cross-member therefore has, during its extension, in the case of an accident, a movement opposite to the movement of the user's pelvis. Note that the amplitude of the movement of the cross-member upwards can be relatively low and must especially be understood as a movement upwards in relation to the general seat pan plane. The orientation of the trajectory of the cross-member towards the rear will therefore be selected according to the configuration of the seat and especially its seat pan so as to counteract, as far as possible, the movement of the user's pelvis during a shock and also to reduce, as far as possible, the distance between the cross-member and the user during the extension.

According to a first design, the guide means consist of main grooves made in the seat pan framework.

In the rest position, the anti-sub-marining cross-member is located towards the front of the seat pan and is placed more or less under the thighs of the seat user below the surface of the seat pan, so as not to disturb the comfort of the seat. The cross-member is, for example, connected by a cable to a seat belt pyrotechnical pretensioner which, in a manner known itself, enables a high tensile force to be exerted on the seat belt attachment during a shock.

In the case of a shock, with this first design, the cross-member is driven by the pretensioner and is guided by the main grooves along a first trajectory directed towards the top and towards the rear of the seat to reach the extended position where the cross-member ensures the retention of the user's pelvis.

When the cross-member is thus completely extended, and to avoid injuries to the lumbar region by excessive compression loads, the cross-member can then progressively retract towards the inside of the seat, to a retracted position, under the action of the thrust of the user's pelvis, this retraction being controlled by the energy dissipation means.

According to a first example of the design, the energy dissipation means consist of secondary grooves made directly in the seat pan framework and connected to the main grooves. The width of the secondary grooves is appreciably lower than the transverse dimension of the ends of the cross-member so that the ends of the cross-member can only move by deforming the edges of the secondary grooves.

Thanks to this arrangement, the thrust of the pelvis on the cross-member is limited to a predetermined threshold so that, during retraction, the cross-member is held in contact with the user's buttocks while enabling a controlled and progressive movement of the pelvis.

According to a second design, the guide means consist of links installed so as to pivot on a seat pan framework and connected together by the cross-member.

In this second design, according to a specific arrangement corresponding to the first example of the energy dissipation means, the secondary grooves are made in the links and are oriented along the longitudinal direction of the links.

The ends of the cross-member are connected to a first end of the two links installed so as to pivot by their other ends on the side flanges of the seat pan framework. The cross-member is connected to the seat belt pyrotechnical pretensioner for example with a cable which pivots the links towards the rear in the case of a shock. Stops, located on the seat pan flanges, enable the angular movement of the links to be limited by securing the links in an oblique position oriented downwards and forwards when the cross-member is in an extended position. As the secondary groove is made in the links, the controlled retraction of the cross-member is made along a link axis, the ends of the cross-member then deforming the edges of the secondary grooves.

According to a second example of the design of the energy dissipation means, a cellular foam cushion is placed on the cross-member. In this case, when the cross-member is in extended position, the thrust of the pelvis is absorbed by the cushion which has sufficient hardness during normal use so as not to sink under the weight of the user but which can however be compressed under high pressure thus avoiding an exaggerated compression of the lumbar region.

According to a specific arrangement, the seat pan includes adjustment means to modify the rest position of the cross-member in the seat pan.

The adjustment means, for example a screw-nut system, are connected to the ends of the cross-member and enable the rest position of the cross-member to be modified to increase the firmness of the seat pan by moving the cross-member towards the surface of the seat pan. Note that the cross-member always retains the pelvis of the user during a shock.

Other characteristics and advantages will appear in the description which will be given of various designs of a seat pan in compliance with the invention.

Refer to the appended drawings on which:

DETAILED DESCRIPTION OF THE INVENTION

Figure 1:
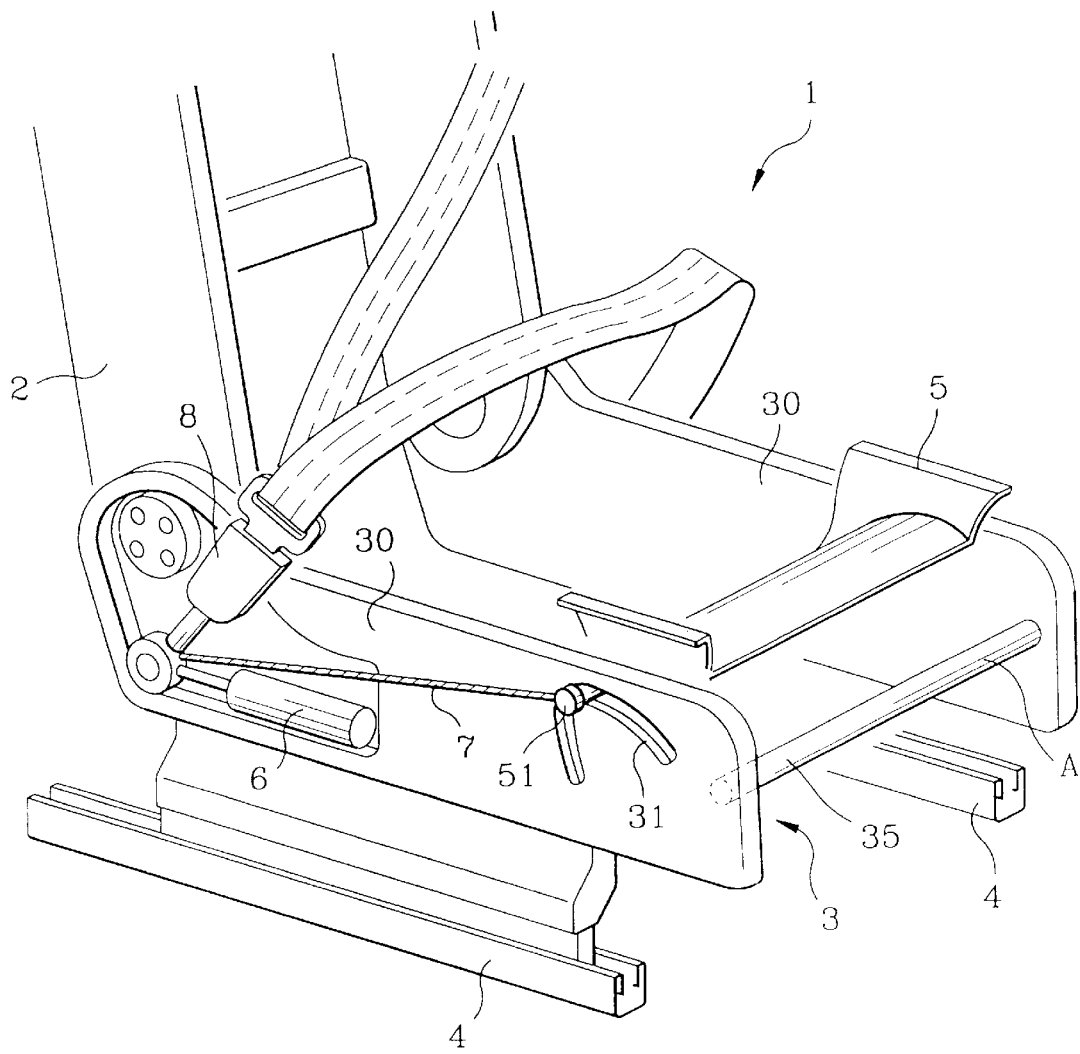
FIG. 1 is a perspective view of an automobile vehicle seat, according to the first design, including an anti-sub-marining cross-member, located in the seat pan, the ends of which slides in main guide grooves and secondary energy dissipation grooves during a shock.

The automobile vehicle seat 1, shown schematically on FIG. 1, conventionally includes a backrest framework 2 hinged on a seat pan framework 3, this being attached to the floor of the automobile vehicle by means of two slides 4 enabling longitudinal adjustment of the position of the seat.

An anti-sub-marining cross-member 5, designated hereafter simply as "cross-member", extends transversally between the sides flanges 30 of the seat pan framework and includes two cylindrical journals 51 extending in the direction of the cross-member 5, from the ends of the cross-member.

The journals 51 slide in grooves 31, generally parabolic-shaped, made in the side flanges 30. The arms of the parabola consist of a main groove 32 (FIG. 3), oriented upwards and towards the rear of the seat, in which the journals 51 can slide freely and a secondary groove 33, oriented towards the bottom of the seat, with a width appreciably lower than the diameter of the journals so as to dissipate the energy by friction during the deformation of the edges of the secondary groove by the journals 51.

The journals are connected, for example, by a cable 7 to a seat belt pyrotechnical pretensioner 6 installed on the side flanges 30 of the framework. This, known by a person skilled in the art, enables a high tensile force to be exerted on a seat belt attachment 8, so as to take up the clearance existing between the belt and the seat passenger during a shock.

Figure 2:
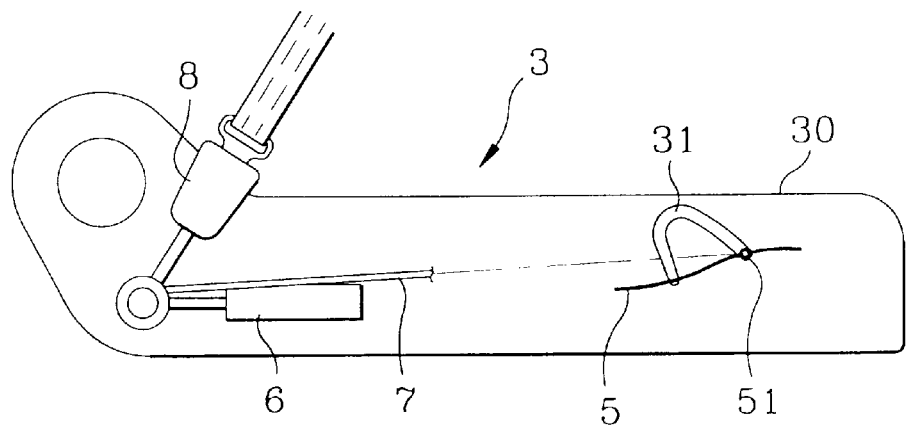
FIGS. 2, 3 and 4 show side views of the seat of FIG. 1 illustrating the various positions of the anti-sub-marining cross-member during a shock.

In rest position, shown on FIG. 2, the cross-member 5 is located towards the front of the seat below the surface of the seat pan.

Figure 3:
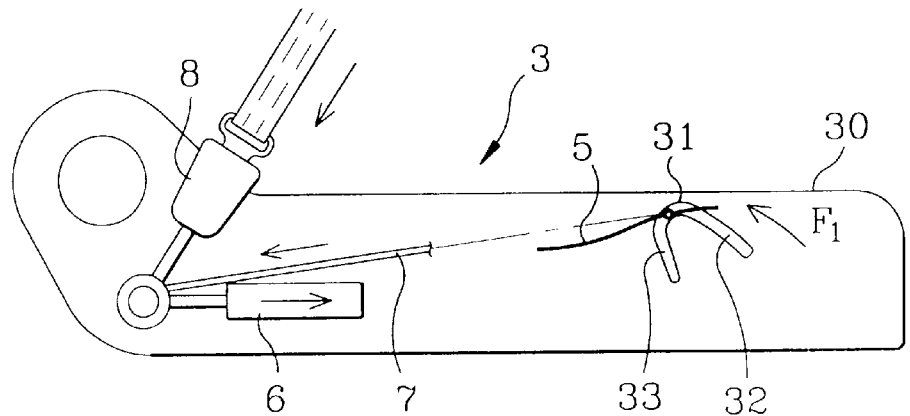

When a shock on the vehicle tends to throw the user of the seat forwards, the cross-member moves, under the action of the pretensioner 6, upwards and towards the rear of the seat, along trajectory F1 (FIG. 3), to reach an extended position, shown on FIG. 3, where the cross-member is then located under the thighs of the user to limit the movement of the pelvis towards the front of the seat.

The extended position of the cross-member is a stable position, that is, the pretensioner 6 still exerts a tensile force on the cable 7 to prevent the cross-member from returning to the rest position under the thrust exerted by the user's pelvis. An automatic locking system could also be used to secure the cross-member in extended position.

Figure 4:
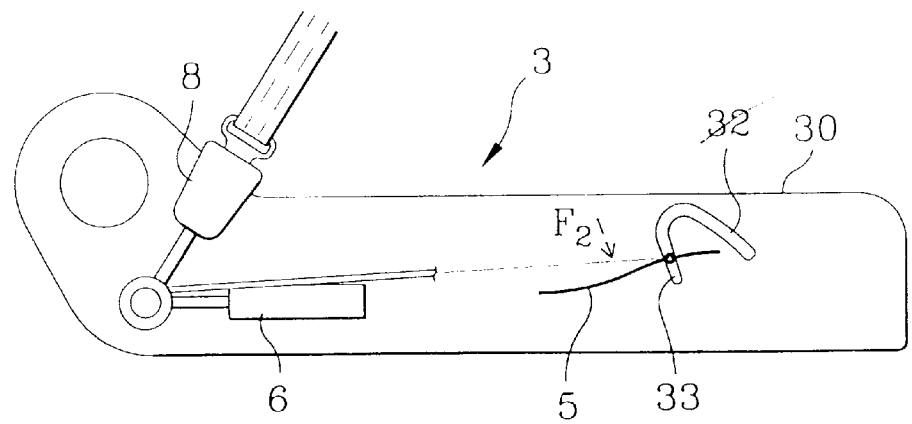

Then, to avoid excessive compression on the user's lumbar region, the cross-member can be gradually retracted inside the seat, along trajectory F2 of FIG. 4, under the thrust exerted by the user's pelvis, while remaining held in contact with the user's thighs. The retraction is controlled by the deformation of the edges of the secondary groove 33 by the journals 51, from a threshold determined so as to maintain the force transmitted by the cross-member 5 to the seat user within physically acceptable limits.

It is also possible to move the cross-member 5 in the other direction, that is, the initial rest position would then correspond to the retracted position on FIG. 4. The cross-member must then slide freely in groove 33 and dissipate the energy by friction by the deformation of the edges of groove 32 which would then have a width lower than the diameter of the journals 51.

Figure 5:
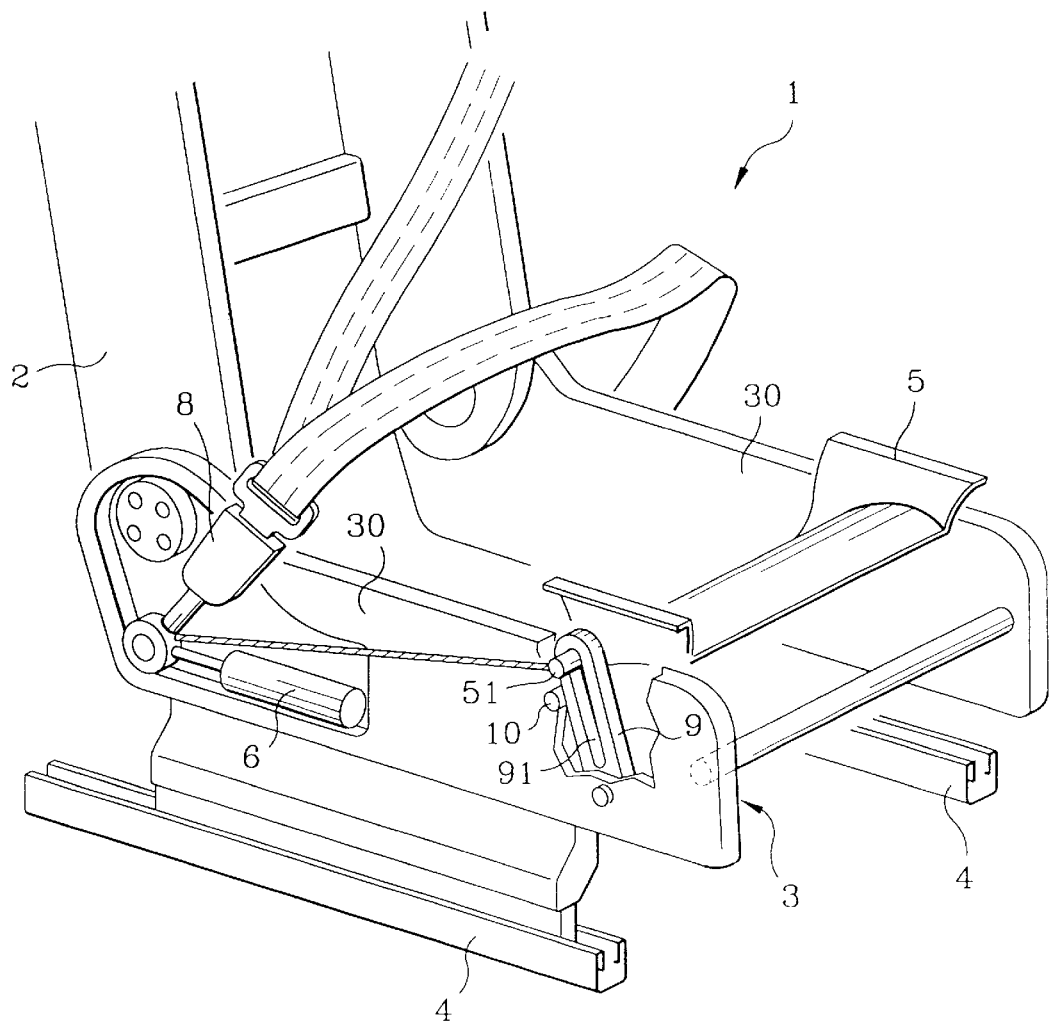
FIG. 5 is a cut perspective view of a seat showing the use of the links to extend the cross-member according to a second design.

According to a second design, shown on FIG. 5, the extension of the cross-member 5 is ensured by links 9 in which secondary grooves 91 are made, oriented along link direction. These are installed so as to pivot on the side flanges 30 of the seat pan framework and are connected at one of their ends by the cross-member 5. As before, the cross-member journals are connected, for example by a cable 7, to the belt pretensioner 6.

Stops 10 are placed on the side flanges 30 of the seat pan framework to limit the angular movement of the links to secure the links when the cross-member is in extended position.

Figure 6:
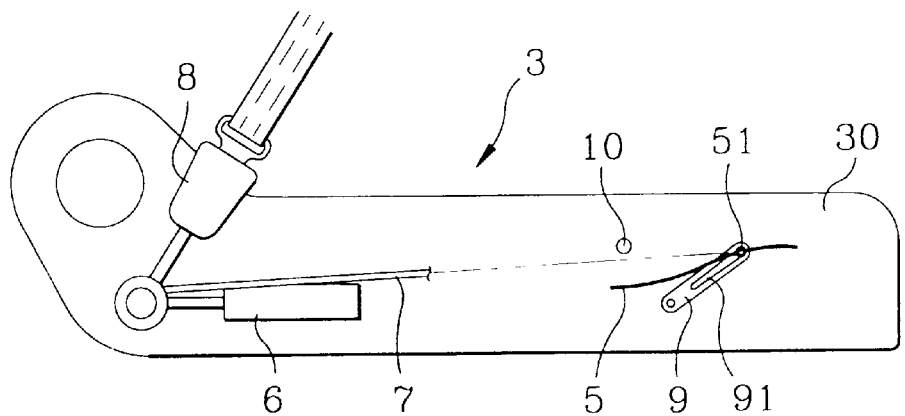
FIGS. 6, 7 and 8 are side views of the seat pan of FIG. 5 illustrating the various positions of the cross-member during a shock.
Figure 7:
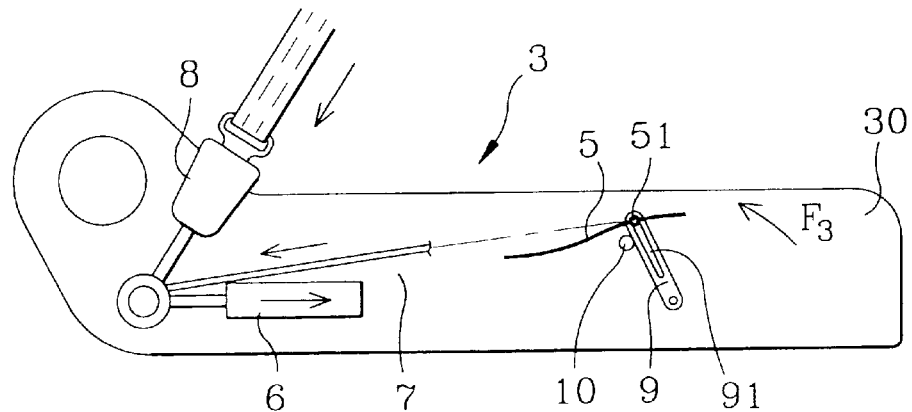

In relation to FIGS. 6 and 7, when a shock on the vehicle tends to throw the seat user forwards, the links 9 are then driven by the pretensioner and the cross-member 5 extends upwards and towards the rear of the seat, along a trajectory shown by arrow F3, from its rest position to the extended position.

Figure 8:
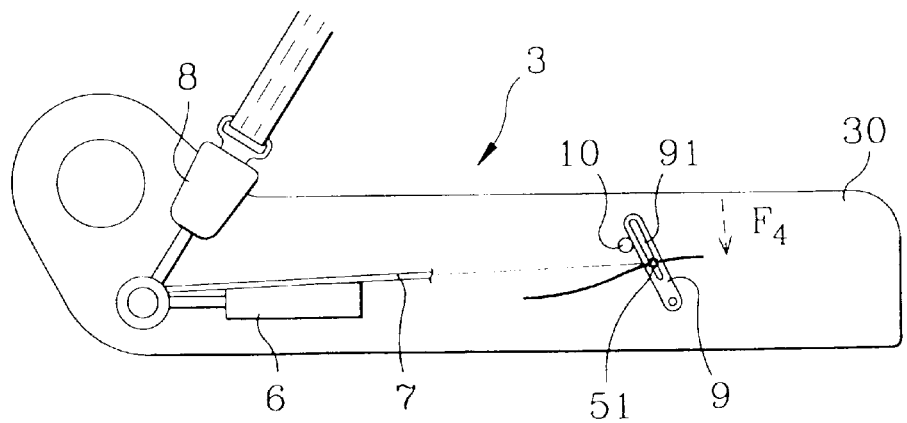

As soon as the links 9 are secured by the stops 10, as shown on FIG. 8, the cross-member can then gradually retract towards the inside of the seat, along the direction shown by arrow F4, in the link longitudinal direction, under the thrust exerted by the user's pelvis. The edges of the secondary groove 91 are then deformed by the journals 51, from a predetermined threshold, to hold the cross-member in contact with the user's thighs.

Figure 9:
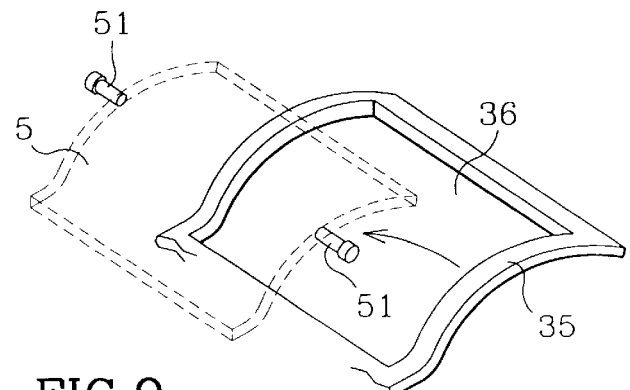
FIG. 9 is a perspective view of an anti-sub-marining cross-member retractable into the seat pan framework.

In the case where the bar connecting the two flanges 30 is replaced by a profiled seat pan nose, the cross-member 5 could be, as shown on FIG. 9, retracted in the rest position into the nose 35 of the seat pan 3 thanks a cut-out 36 made in the said nose. This arrangement enables the overall size of the seat pan to be reduced by integrating the cross-member into the framework.

Figure 10:
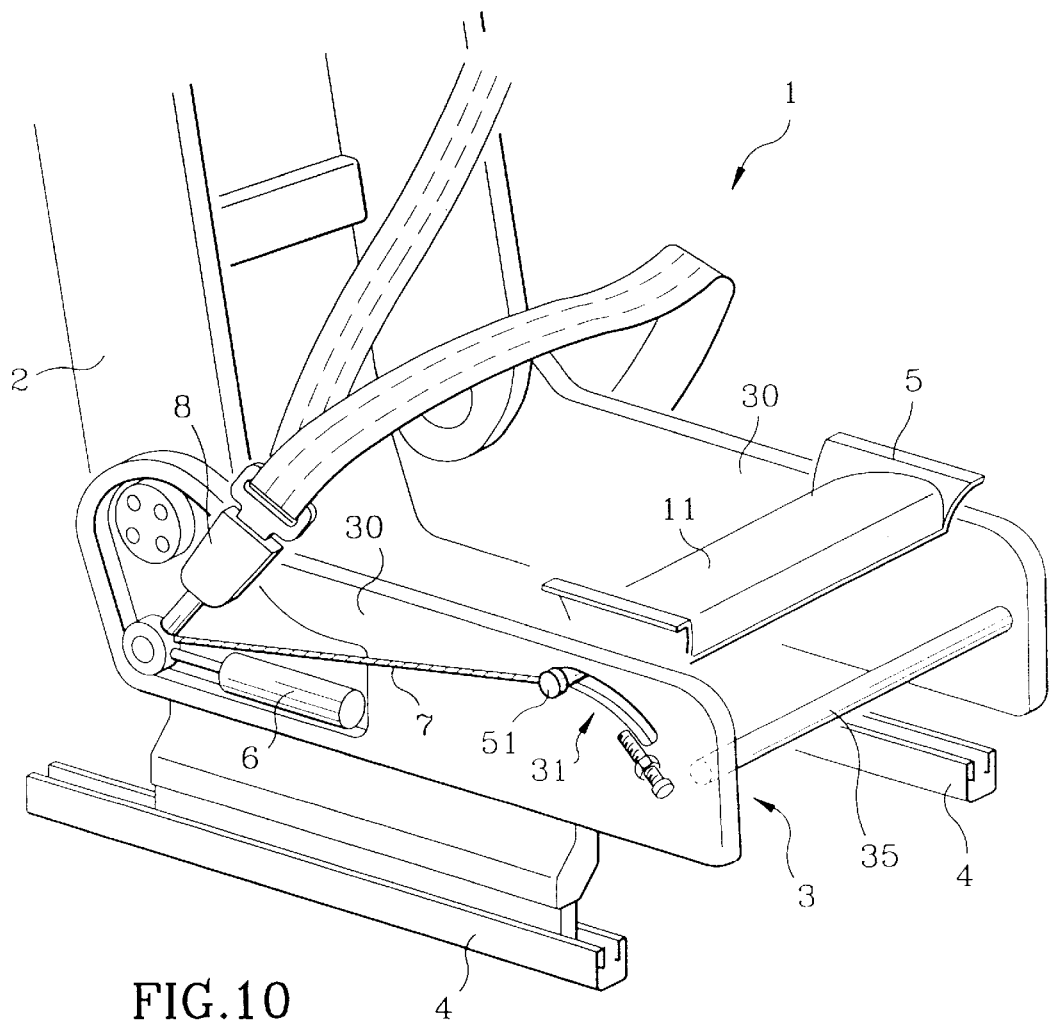
FIG. 10 is a perspective view of a seat, according to the first design, using a cellular foam cushion according to the second design example of the energy dissipation means.

The seat pan 1, shown on FIG. 10, includes the main grooves 31, made in the side flanges 30 of the seat pan framework in which the journals 51 can slide freely from the rest position to the extended position of the cross-member. The energy dissipation means consist of a cellular foam cushion 11 placed on the cross-member 5.

During a shock, the cross-member 5 is driven by the pretensioner 6 towards the extended position where the thrust exerted by the user's pelvis is then absorbed by the cushion 11, the cross-member always being held in contact with the user's thighs by being secured in an extended position dire to the locking, of a conventional type, of the pretensioner. The hardness and the density of the foam of the cushion will be determined so as to facilitate the compression of the cushion from a threshold which will avoid exaggerated compression of the lumbar region.

Also, as shown on FIG. 10, a screw-nut system is placed on the side flanges 30 of the seat pan framework which acts on the journals 51 to modify the rest position of the cross-member by moving it towards or away from the surface of the seat pan. In this case, note that the cable 7 can be more or less slack in cross-member rest position but that the belt pretensioner 6 will however ensure the tensioning of the cable and the extension of the cross-member during a shock.

Figure 11:
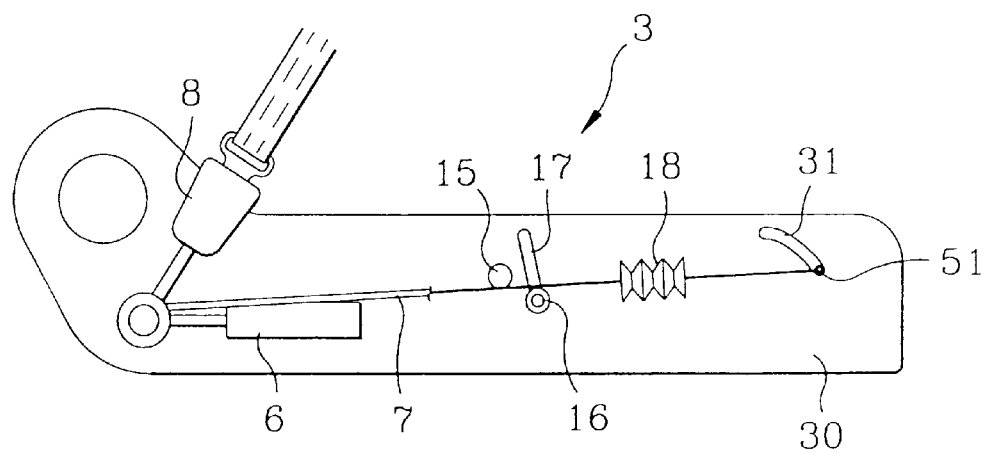
FIGS. 11, 12 and 13 are side views of the seat pan showing various positions of the cross-member, again according to the first design, and using a third example of the energy dissipation means showing adjustment means to modify the rest position of the cross-member.
Figure 12:
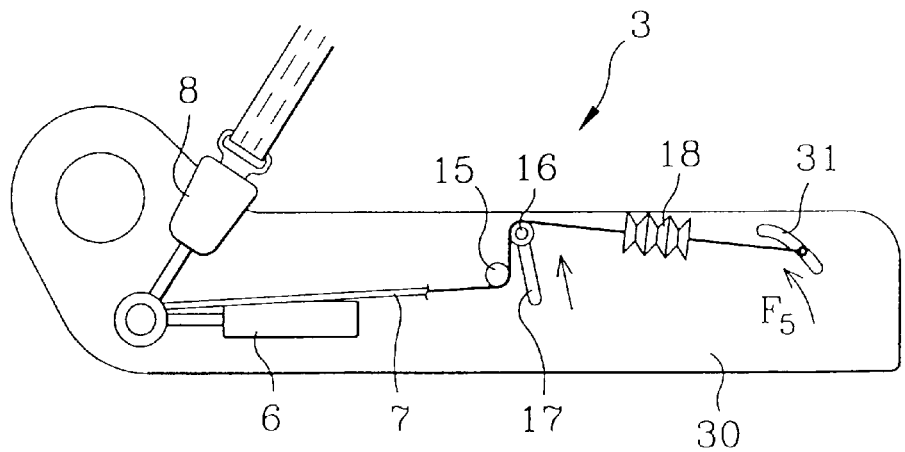
Figure 13:
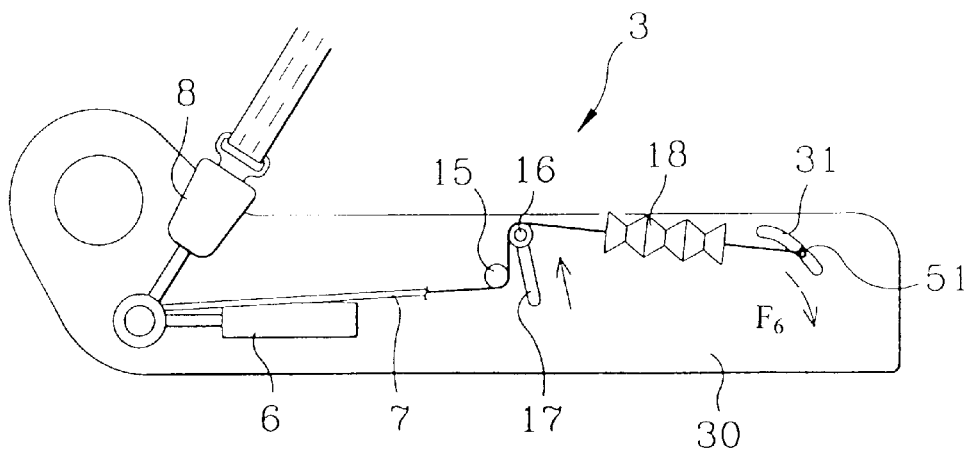

FIGS. 11 to 13 show a design variant for the cross-member rest position adjustment means and the energy disposition means.

The seat pan 3 of the seat shown on FIG. 11 includes the main groove 31 in which the journal 51 can slide freely from the rest position to the extended position of the cross-member 5. The cross-member is connected, for example, by a cable 7, to the belt pretensioner 6. The cable 7 is equipped with an energy dissipator 18; of a type known by a person skilled in the art, in the form of flexible bellows which, initially, are in a retracted position. From a certain threshold of the tensile force exerted on the ends of the bellows, the bellows extend so that their effective length increases.

To modify the rest position of the cross-member, the seat pan includes a pulley 15, attached to the seat pan framework, and a stud 16 placed on either side of the cable 7. The stud 16 can slide and be blocked by the user in an adjustment groove 17, made in the side flanges 30 of the seat pan framework, which extends more or less crosswise to the direction of the cable 7. When the user of the seat moves the stud 16, the cable 7 is tensioned and the cross-member 5 moves in the main groove 31, towards the surface of the seat pan without for this reaching the extended position.

During a shock, the belt pretensioner 6 will drive the cross-member 5, by means of the cable 7, in the direction shown by arrow F5 (FIG. 12), to the extended position from where the thrust exerted by the user on the cross-member is then absorbed by the progressive release of the bellows 18, as shown on FIG. 13, the cross-member then moving in the main groove 31 in the direction opposite to its extension as shown by arrow F6. Note that the pretensioner 6 will always exert a tensile force on the cable 7 to ensure the release of the bellows 18.

The invention is not limited to the designs shown only as an example. In particular:

if a foam cushion is used to absorb the energy, the extension of the cross-member can be ensured by links installed so as to pivot on the seat pan framework, if bellows are used to dissipate the energy during a shock, the extension of the cross-member can also be ensured by pivoting links, if secondary grooves are used, with a width appreciably less lower than the diameter of the journals, to dissipate the energy by progressive deformation of the edges of the groove by the journals, an additional cushion could be placed over the cross-member to absorb the shock when the cross-member comes into contact with the thighs of the user under of the action of the pretensioner.

What is claimed is:

1. A seat pan for an automobile vehicle seat, the seat pan comprising: an anti-sub-marining cross-member to limit movement of a user's pelvis towards the front of the seat, the cross-member extending crosswise to a seat pan framework and which can move, under action of a drive means, from a rest position to an extended position where the cross-member limits the movement of the pelvis towards the front of the seat, ends of the cross-member being guided by guide means along a first trajectory, and the seat pan including energy dissipation means to control, from a predetermined threshold and from the extended position of the cross-member, the forces transmitted by the seat to the user, the first trajectory being oriented upwards and towards a rear of the seat.

2. Seat pan in accordance with claim 1, wherein the guide means includes grooves formed in the seat pan framework.

3. Seat pan in accordance with claim 1, wherein the guide means includes links installed so as to pivot on the seat pan framework and connected together by the cross-member.

4. Seat pan in accordance with claim 1, wherein the energy dissipation means comprises secondary grooves of width appreciably smaller than the transverse direction of the ends of the cross-member, and in which the ends of the cross-member can move by deforming the edges of the secondary groove.

5. Seat pan in accordance with claim 1, wherein the energy dissipation means includes a cellular foam cushion placed on the cross-member.

6. Seat pan in accordance with claim 4, wherein the guide means comprises: grooves formed in the seat pan framework, and respective secondary grooves made in the seat pan framework and integrally connected to the grooves.

7. Seat pan in accordance with claim 4, and further wherein the guide means includes links installed so as to pivot on the seat pan framework and connected together by the cross-member, the secondary grooves being made in the links and oriented in a link direction.

8. Seat pan in accordance with claim 1, together with adjustment means to modify the rest position of the cross-member in the seat pan.

* * * * *